United States Patent [19]

Friedman et al.

[11] Patent Number: 4,782,815
[45] Date of Patent: Nov. 8, 1988

[54] LIQUID-BACKED GAS-FIRED HEATING SYSTEM

[75] Inventors: James N. Friedman; Chester D. Ripka, both of Syracuse, N.Y.

[73] Assignee: Carrier Corporation, Syracuse, N.Y.

[21] Appl. No.: 17,393

[22] Filed: Feb. 20, 1987

[51] Int. Cl.⁴ .................... F24H 1/00; F24D 3/00
[52] U.S. Cl. .................... 126/361; 126/344; 126/362; 126/116 R; 237/57
[58] Field of Search .......... 126/361, 344, 362, 116 R, 126/101; 237/34, 36, 45, 56, 57

[56] References Cited

U.S. PATENT DOCUMENTS

| | | | |
|---|---|---|---|
| 3,994,281 | 11/1976 | Godart | 126/361 |
| 4,465,025 | 8/1984 | Schröder | 126/361 X |
| 4,492,185 | 1/1985 | Kendall et al. | 126/361 X |
| 4,664,096 | 5/1987 | Narang | 126/361 X |

Primary Examiner—Larry Jones
Attorney, Agent, or Firm—Robert H. Kelly

[57] ABSTRACT

A liquid-backed gas-fired heating system is disclosed which utilizes an infrared burner module having a helical coil wrapped concentrically thereabout. The helical coil located in the radiant zone and convective zone of the module receives heat from the hot products of combustion and transfers the heat to a circulating fluid, which in turn transfers the heat through a fan coil to the space to be heated.

7 Claims, 2 Drawing Sheets

LIQUID-BACKED GAS-FIRED HEATING SYSTEM

BACKGROUND OF THE INVENTION

This invention relates generally to a heating system and, more particularly, to a heating system which utilizes an infrared burner module having a heat exchanger coil wrapped around a radiant burner.

In heating systems for homes and commercial buildings, central furnaces to heat a space all operate on the same general principle. Air for a space to be heated circulates around a closed system, and is heated either as it passes through a heat exchanger in contact with a burning fuel, or as it passes in contact with a secondary fluid which has been heated by a burning fuel. Since burning the fuel results in the production of noxious combustion gases having exhaust temperatures which can exceed 500° F., it is necessary to exhaust the combustion gases through a chimney or flue to the atmosphere. These systems are relatively inefficient due to the high exhaust temperatures of the flue gases, and costly due to the construction of the necessary flue or chimney.

An indirect fired furnace, one in which the air being heated is not contacted directly by the combustion gases generated, is generally used in both forced air systems and hydronic systems.

A forced air system consists primarily of a heat exchanger having combustion chambers arranged in relation to the flow of air to be heated such that fuel is introduced at the lower end of the chamber where a combustion flame causes heat to be generated. The heat rises through a series of internal passages before exiting through an upper end of the combustion chamber into the flue or chimney. Simultaneously, circulated space air to be heated passes around the outside of the heat exchangers to absorb heat through conduction and convection.

A hydronic system consists primarily of a firebox having a heat exchanger therein. The heat exchanger is in a closed loop for continuously circulating fluid, e.g. water, from the heat exchanger to a remote radiator located in the space to be heated. However, this system is also relatively inefficient and expensive due to the combustion gas temperatures at the outlet of the firebox, the cost of the chimney, and the delay in heating the mass of liquid in the closed loop.

In an attempt to increase the efficiency of a heating system condensing furnaces were implemented. In condensing furnaces exhaust combustion gases are used to preheat the space air prior to this air contacting the primary heat exchanger. Thus, in this type of furnace exhaust temperatures are reduced but corrosive condensates are formed as the exhaust combustion gases are reduced below their dew point.

Another drawback of known heating systems is the large size of the furnace. The large furnace structure is the result of the need for large heat exchange surface areas to transfer the heat from the combustion products of the ribbon burner to the space air or hydronic fluid.

Still another drawback of known heating systems is the use of only air or water as the heating medium.

Another problem in space heating installations is the annoying low frequency noise called combustion roar caused by products of combustion within the furnace. This is especially true where the furnace is connected to a duct of the heating system which tends to amplify the noise.

Still another problem in previously known heating systems, as a result of the combustion process used in these systems, is that a furnace normally generates gaseous combustion products which include oxides of nitrogen ($NO_x$) which are vented to the atmosphere as flue gases. It is desirable to limit these oxides of nitrogen emissions since $NO_x$ is considered a pollutant, and combustion systems for gas-fired furnaces sold in certain geographical areas must meet strict $NO_x$ emission standards.

Thus, there is a clear need for a gas heating system having a modular design that will, to a large extent, overcome the problems noted in the prior art.

SUMMARY OF THE INVENTION

It is an object of the present invention to provide a heating system that is quiet, compact, and efficient.

It is another object of the present invention to provide a heating system having a liquid-backed gas-fired heating module which will limit $NO_x$ emissions to a desired level without reducing the combustion efficiency of the system.

A further object of the present invention is to provide a modular heater having a radiant burner which more efficiently transfers heat from the hot products of combustion to a circulating fluid in a heat exchanger coil wrapped around the burner. Moreover, the fluid can be a variety of liquids e.g. water, water glycol, refrigerant 22, 12, 500, 113, or 11.

These and other objects of the present invention are attained by providing a heating system for heating a space having a closed fluid flow loop with a fluid pump or compressor for circulating the fluid in the loop, a remote fan coil for transferring heat to the air in the space to be heated, and a liquid-backed heating module having an infrared burner and a heat exchanger coil wrapped around the burner. The helical heat exchanger coil has a prime or smooth surface in the radiant zone because of the better absorption of radiant heat and have a good surface emissivity to absorb radiant heat and a coated prime tube in the convective zone to protect the tubing from acidic condensate. Further, the outer coil pass is in contact with the outer housing to keep the housing cool since the liquid in the outer coil is about 70°-100° F., or lower. Still further, a certain condensate level is maintained in the module to keep the bottom of the module cool. Also, the helical coils are arranged in parallel flow for two-phase liquids, e.g. refrigerants, to prevent high superheated vapor, while the coils are arranged in counter flow for single phase liquids, e.g. water, for maximum efficiency.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings forming a part of the specification, and in which reference shown in the drawings designate like or corresponding parts throughout the same.

DESCRIPTION OF THE PREFERRED EMBODIMENT

Figure 1:
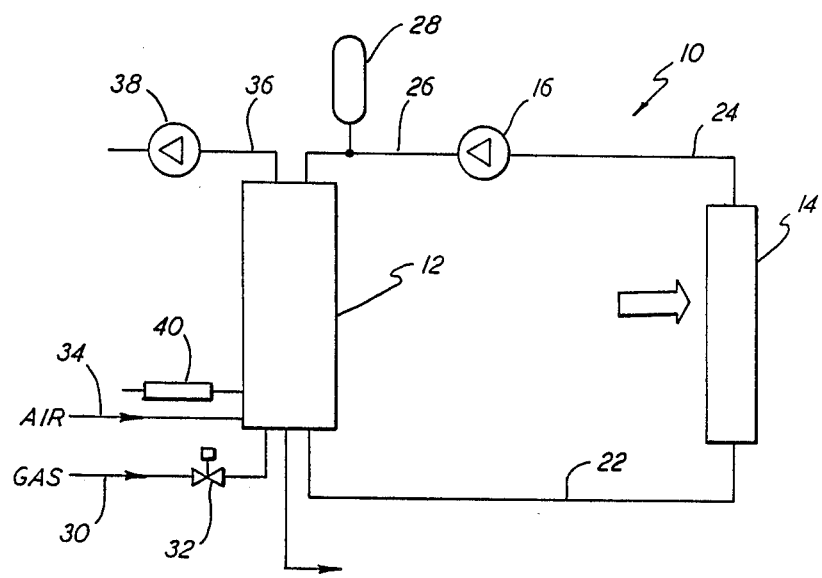
FIG. 1 is a schematic diagram of a hydronic heating system embodying the present invention.

Referring now to FIG. 1 there may be seen a schematic view of a residential heating system 10 using a liquid-backed heating module 12 for supplying energy to the system. The heating system 10 includes heating module 12, remote fan coil 14, and a liquid pump 16. The remote fan coil 14 may typically be a plate fin heat exchanger or a radiator having air flowing therethrough in the direction of the arrow. Radiators are generally used in hydronic systems in which the air in the space to be heated is circulated by gravity. In a conventional forced air system air is drawn from the room through cold air ducts and, after passing around the heat exchanger in the furnace, is discharged through hot air ducts. Normally, a fan is incorporated in the furnace to provide forced circulation of the air between the furnace and the rooms or other space to be heated. In the present invention the fan coil 14 is connected to the discharge of the heating module 12 by a pipe section 22. The fluid in the heating system circulates from the fan coil 14 through pipe section 24 under the pressure of the liquid pump 16 and is returned to the heating module 12 through pipe section 26. An expansion tank 28 is connected to pipe section 26 to take up the volume of expanded liquid and to dampen any pressure surges in the heating system. As illustrated, the heating module 12 includes a gas line 30 having a regulator 32 for supplying fuel to the module. Further, air is supplied to the module through line 34. The air/fuel mixture is burned on the infrared burner, described hereinafter, and the flue gases are discharged from the module through flue pipe 36 by induction fan 38. If, however, the pressure drop across the module is too high for an induction fan, a forced draft fan may be used upstream of the module. Ignition device 40 is a conventional furnace control and will not be described in detail herein. In a conventional control, a spark ignition system is used to ignite the air/fuel mixture and a flame sensor is used to sense whether combustion actually occurs. The control system, for example, may be a Honeywell Model S87D Direct Spark Ignition System.

Figure 2:
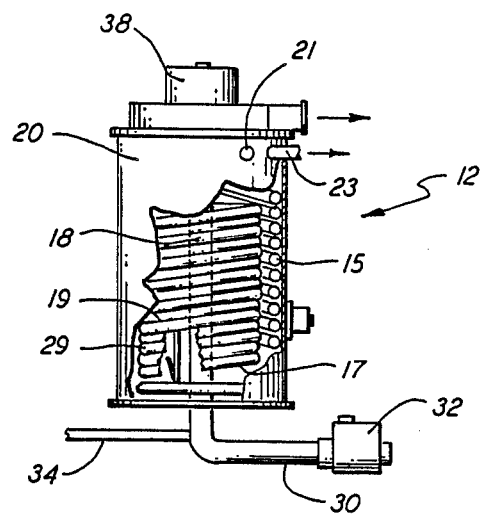
FIG. 2 is an elevation view, partly broken away, of the liquid-backed gas-fired heating module of the present invention having a two-row coil arranged in parallel flow.

As best shown in FIG. 2, the heating module 12, comprises a housing 20 with an infrared burner located centrally therein. In this embodiment air is supplied through air line 34 and fuel is supplied through regulator 32 and gas line 30 such that the air and gaseous fuel are 100% premixed, thus, no secondary combustion occurs. A heat exchange means 19 is located in spaced relation to the infrared burner 18 to receive heat from the infrared burner. The heat exchange means in the form of a two-row helical coil has fluid, e.g. refrigerant flowing therethrough which absorbs heat from the infrared burner 18 and transfers this heat to the space to be conditioned by way of the remote fan coil 14. The refrigerant enters the inner coil through inlet 21 and flows down through the inner coil and up through the outer coil 15 and out outlet 23. This parallel flow of a two-phase liquid prevents high superheat of the vapor. Moreover, the heat exchange means 19 is heated by both radiation and convection heat transfer from the infrared burner 18.

Figure 3:
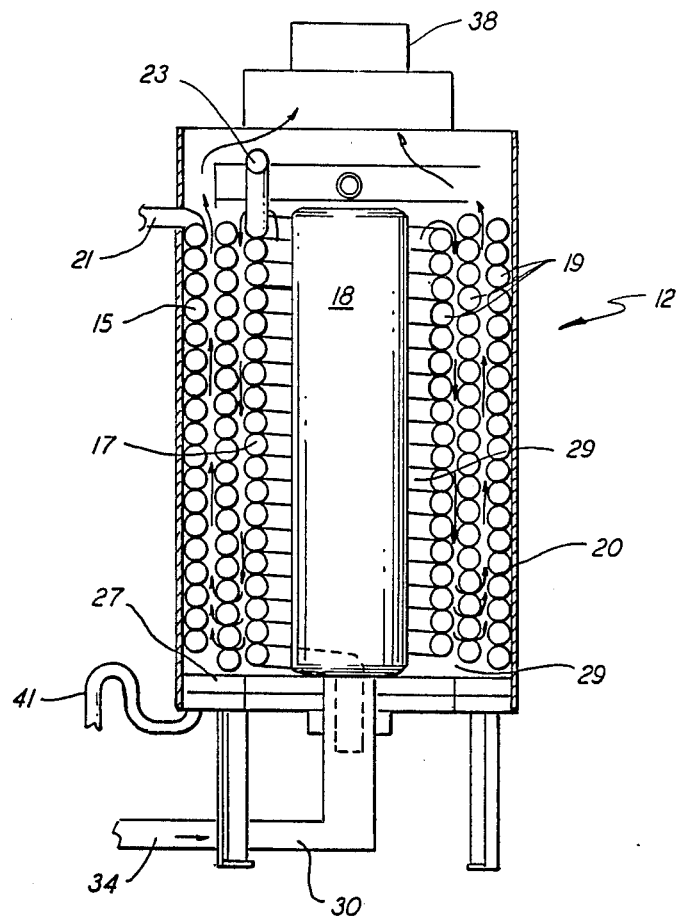
FIG. 3 is another embodiment of the liquid-backed gas-fired heating module of the present invention having a three-row coil arranged in counter flow.

In FIG. 3 the adjacent coils of a three-row helical coil are closely spaced to form a plurality of walls. In this embodiment the fluid enters the outer coil 15 through inlet 21 and exits outlet 23 in the inner coil 17. Thus the combustion gases will flow along the inner wall of the inner coil 17 and then down between the inner and middle coil walls and up between the middle and outer coil, to be discharged by the induction fan 38 to atmosphere. Thus the coil is arranged in counter flow for single phase fluids, e.g. water, for maximum efficiency.

The outer coil 15 of the present invention is in direct contact with the housing 20 to keep the housing cool, since the fluid in the outer coil is generally 70°-100° F. Further, as shown in FIG. 3 condensate 27 collects at the bottom of the module to keep the bottom of the module cool. The level of the condensate 27 is maintained by trap 41. Moreover, the acidic condensate necessitates a protective coating 29, e.g. a layer of polypropylene, to protect the prime or smooth surface of the coils. Prime tube gives better absorption of radiant heat than finned tube and also coats easier.

What is claimed is:

1. A heating system for heating a space comprising:
a closed fluid flow loop means having a heat transfer fluid flowing therethrough;
means for circulating said heat transfer fluid through said closed fluid flow loop means;
heating module means for transferring heat to said heat transfer fluid flowing through said closed fluid flow loop means, said module means including a tank enclosure, an infrared burner disposed within said tank enclosure, said burner connected to a supply for a mixture of vaporous fuel and air, heat exchange tubing disposed within said tank enclosure and in heat exchange relationship with said infrared burner, said heat exchange tubing configured in a spiral juxtaposed to said infrared burner for absorbing heat from said infrared burner to heat the fluid flowing through said tubing;
a fan coil connected in said closed fluid flow loop means downstream of said heating module means for transferring heat from said fluid to the space to be heated.

2. The heating system as set forth in claim 1, wherein said heat exchanger tubing includes a multiple lead helical coil.

3. The heating system as set forth in claim 2, wherein said helical coil includes a smooth outer surface.

4. The heating system as set forth in claim 2 wherein one lead of said multiple lead coil is in contact with said tank enclosure wherein the enclosure is cooled.

5. The heating system as set forth in claim 1 wherein said tank enclosure includes a condensate level control means for controlling the condensate level in said tank enclosure wherein said enclosure is cooled by the condensate.

6. In a space heating system having a sealed flow passage for a heat transfer liquid, means for recirculating the liquid in the flow passage, and a hot air coil for transferring heat from the liquid to the air of the space to be heated, a heating module comprising:
an enclosure means for supporting combustion therein;

an infrared burner means disposed within said enclosure means said burner means connected to a supply for a mixture of vaporous fuel and air whereby said mixture is burned on the surface of said burner means to bring it to incandescence:

a first portion of the flow passage disposed within said enclosure means, said first portion configured into a spiral and having an inner portion generally positioned juxtaposed said infrared burner means for transferring heat from said burner means to the liquid in the flow passage; and an induction fan means for drawing products of combustion through said enclosure means.

7. A heating module comprising:

an elongated enclosure means for supporting combustion therein;

an infrared generator means disposed within said enclosure means, infrared generator means connected to a supply of vaporous fuel and excess air mixture whereby said mixture is burned on the surface of said infrared generator means;

heat exchange tubing means disposed within said enclosure means generally juxtaposed along the entire length of said infrared generator means in heat exchange relationship with said infrared generation means, said tubing means configured in at least a single row spiral and connected to a fluid loop for transferring heat from said infrared generator means to a fluid flowing in said fluid loop; and an induction fan means disposed exteriorly of said enclosure means for drawing products of combustion through said enclosure means.

* * * * *